United States Patent [19]

Nakasuna

[11] 4,071,865
[45] Jan. 31, 1978

[54] CASSETTE TAPE RECORDER
[75] Inventor: Seikoh Nakasuna, Katsuta, Japan
[73] Assignee: Hitachi, Ltd., Japan
[21] Appl. No.: 690,588
[22] Filed: May 27, 1976
[30] Foreign Application Priority Data
  May 30, 1975  Japan ................................ 50-64276
[51] Int. Cl.² ........................ G11B 21/22; G11B 5/54; G11B 15/22
[52] U.S. Cl. .................................... 360/105; 360/96; 360/137
[58] Field of Search ........................... 360/105, 96, 137
[56] References Cited
U.S. PATENT DOCUMENTS
3,806,666   4/1974   Hashizume et al. .................. 360/96

Primary Examiner—Robert S. Tupper
Attorney, Agent, or Firm—Craig & Antonelli

[57] ABSTRACT

A cassette tape recorder in which a supply turntable and a take-up turntable supported by a base are respectively disposed for rotating engagement with a pair of hubs in a cassette, and a pinch roller and magnetic heads are disposed on the base on the front wall side of the cassette for recording and reproducing engagement with a magnetic tape. An actuating push button group including a play button is pivoted to the base on the rear wall side of the cassette by a pivot extending beneath the base. In response to the depression of the play button, the pinch roller and magnetic heads are advanced toward the cassette, and the tape is fed in the take-up direction at a predetermined take-up speed.

8 Claims, 6 Drawing Figures

CASSETTE TAPE RECORDER

BACKGROUND OF THE INVENTION

1. Field of the Invention

This invention relates to cassette tape recorders, and more particularly to a cassette tape recorder of the kind using a cassette including a housing which has an upper wall, a lower wall, a front wall, a rear wall, and a pair of side walls, and in which a magnetic tape wound around one of a pair of hubs supported freely rotatably between the upper and lower walls with one end thereof fixed to that hub is guided toward the other hub along a path extending adjacent to a plurality of openings bored in the front wall to be wound around the other hub with the other end thereof fixed to the latter hub, the tape being adapted to be fed at a predetermined take-up speed during recording and reproduction.

2. Description of the Prior Art

In conventional cassette tape recorders using such a cassette, a slide plate carrying thereon recording and reproducing elements including a pinch roller, a recording-reproducing head and an erase head is disposed immediately behind a group of actuating push buttons including a play button. In such a conventional cassette tape recorder, the cassette is mounted behind the recording and reproducing element with its front wall directed toward these elements, and the slide plate makes sliding movement toward the cassette in response to the actuation of the play button, so that a magnetic tape contained in the cassette can be fed at a predetermined take-up speed for recording or reproduction.

In this conventional cassette tape recorder, however, the cassette mounting position is remote from the actuating push button group, and the cassette must be mounted in the cassette mounting position by inserting the same across the actuating push button group and across the recording and reproducing elements including the pinch roller and magnetic heads. Therefore, it is not easy for the user to detect the amount of tape turns taken up on one of the hubs and to confirm the rotation of the hubs by merely looking in the cassette from the front side of the actuating push button group. The user feels thus quite inconvenient in that he must bring his eyes close to the cassette in confirming the internal state of the cassette. Especially, in a cassette deck of vertical type in which a cassette is mounted in an inclined state, such that the cassette carried on a cassette tray on the slope higher at the front wall side of the cassette than at the rear wall side thereof, namely the cassette is inclined to a vertical cassette insertion opening on a surface of a front panel of the cassette tape recorder, and the user can only look in the cassette from above the actuating push button group, he feels more inconvenient in confirming the internal state of the cassette since he cannot bring his eyes close to the cassette.

SUMMARY OF THE INVENTION

It is an object of the present invention to provide a novel cassette tape recorder in which a cassette can be mounted in a position spaced from the actuating push button group by a shorter distance than hitherto.

Another object of the present invention is to provide a cassette tape recorder of this kind which is simple in construction.

Still another object of the present invention is to provide a cassette tape recorder of this kind in which the magnetic heads can be stably supported.

Yet another object of the present invention is to provide a cassette tape recorder of this kind which facilitates mounting and assembling of various recorder parts.

A further object of the present invention is to provide a cassette tape recorder of this kind which is practically useful and commercially inexpensive.

Other objects of the present invention will become apparent from the following detailed description taken in conjunction with the accompanying drawing.

DESCRIPTION OF THE PREFERRED EMBODIMENTS

Figure 1:
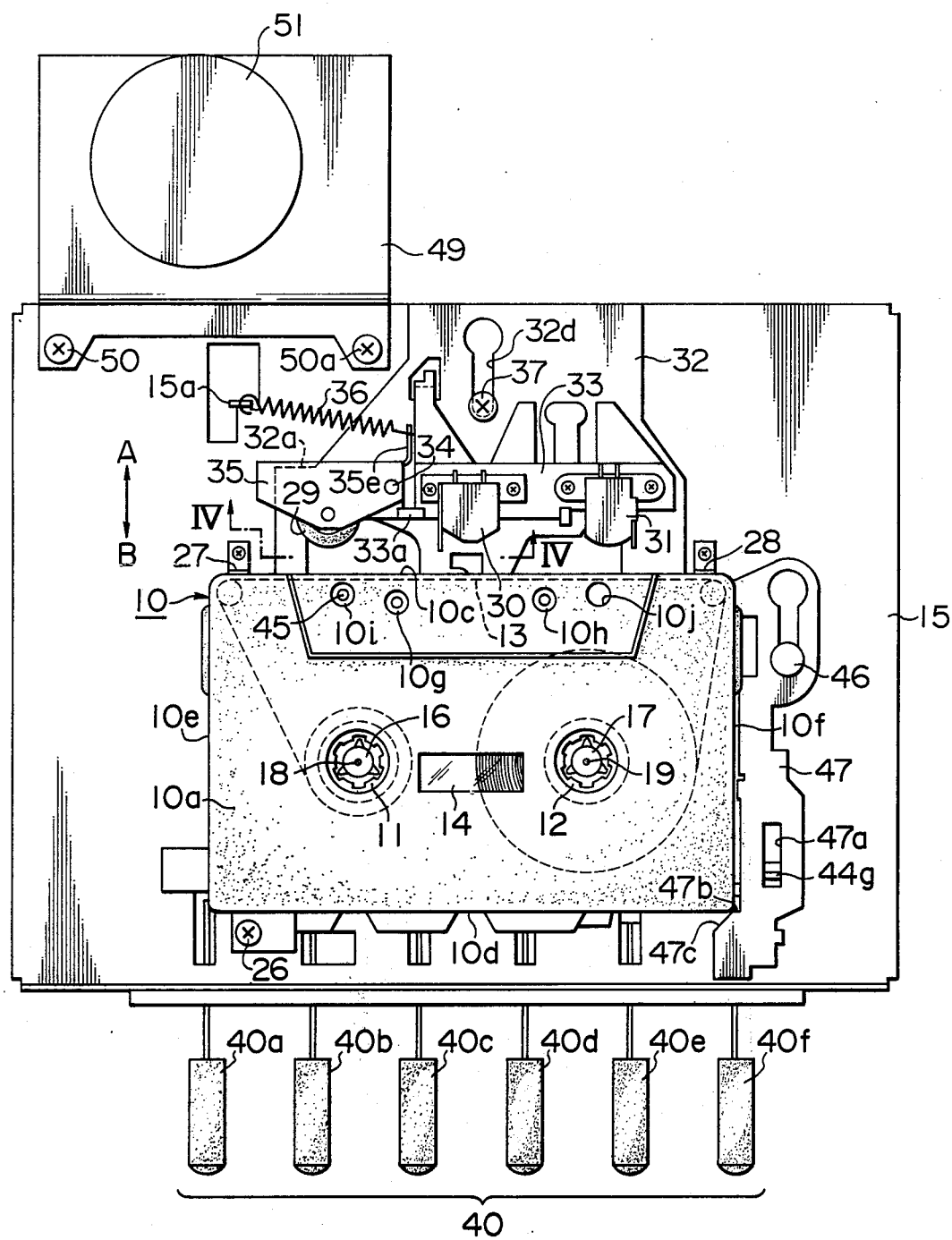
FIG. 1 is a plan view of an embodiment of the cassette tape recorder according to the present invention in the stop mode with a cassette mounted therein.
Figure 2:
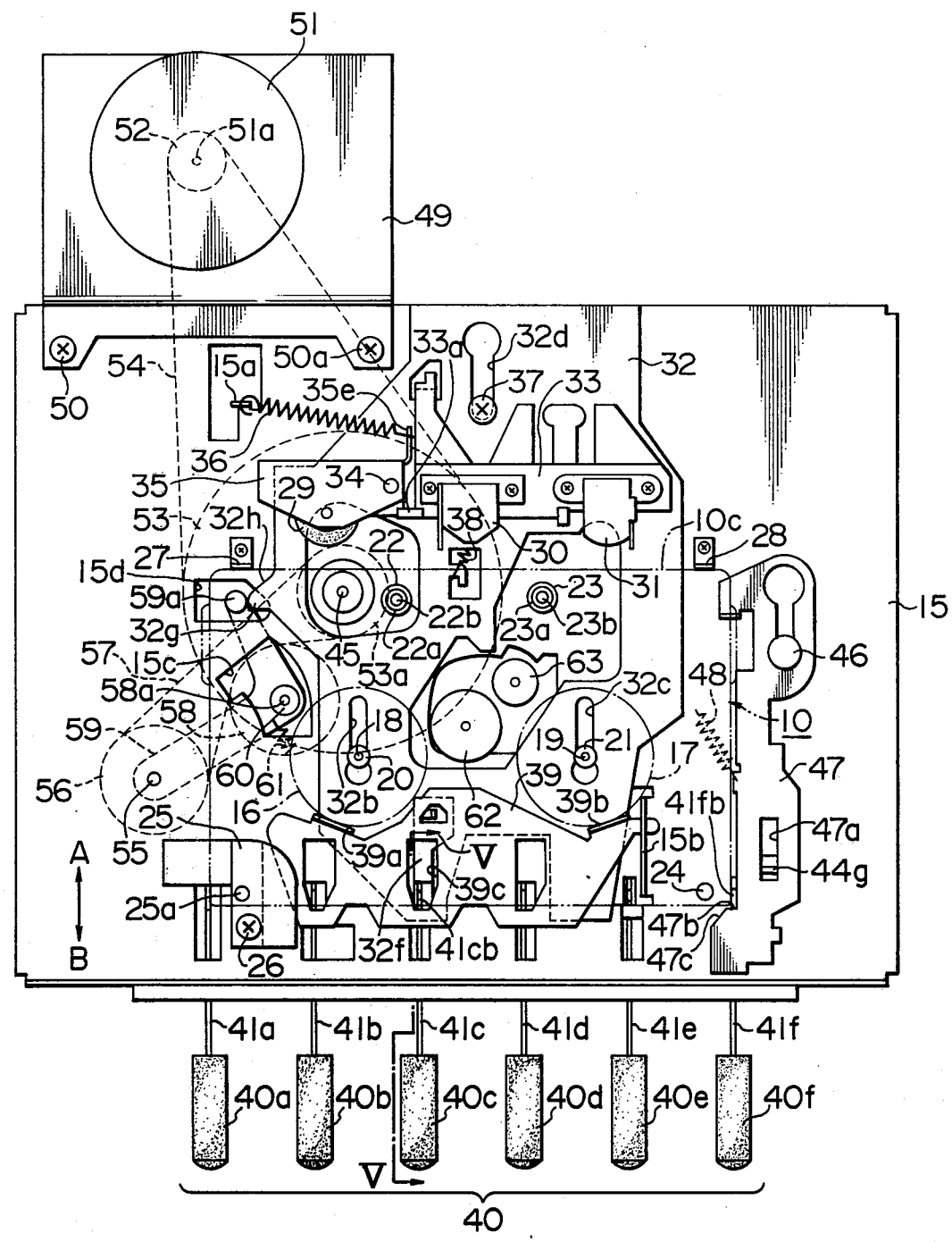
FIG. 2 is a view similar to FIG. 1, but showing the recorder in the state in which the cassette is removed to illustrate the internal structure.

FIG. 1 is a plan view of a preferred embodiment of the cassette tape recorder according to the present invention in the stop mode with a cassette mounted therein, and FIG. 2 is a plan view in which the cassette and a pair of turntables in FIG. 1 are represented by one-dot chain lines to illustrate the internal structure and arrangement of various parts of the cassette tape recorder.

Referring to FIG. 1, a cassette 10 comprises a housing having an upper wall 10a, a lower wall 10b (not shown), a front wall 10c, a rear wall 10d, and a pair of side walls 10e and 10f. A pair of hubs 11 and 12 are supported freely rotatably between the upper and lower walls 10a and 10b, and a magnetic tape 13 is fixed at one end thereof to the hub 11 and is partly wound around this hub 11. The tape 13 extends in parallel with the front wall 10c to be guided along a path extending adjacent to a plurality of relatively large openings (not shown) bored in the front wall 10c and is fixed at the other end therof to the other hub 12 after being partly wound around this hub 12. Further, the cassette 10 comprises a pair of vertically registered windows 14 bored in the middle area of the upper and lower walls 10a and 10b. A pair of cassette-positioning holes 10g, 10h, and a pair of capstanreceiving holes 10i, 10j are bored in the upper wall 10a at positions near the front wall 10c. Needless to say, similar holes (not shown) are bored in the lower wall 10b. A take-up turntable 16 and a supply turntable 17 are disposed for making rotating engagement with the respective hubs 11 and 12 in the cassette 10. The shafts 18 and 19 of these turntables 16 and 17 extend vertically through a base 15 of, for example, a chassis are are fitted in a pair of bushes 20 and 21 respectively. More precisely, as shown in FIG. 2, each of the bushes 20 and 21 comprises a large-diameter upper portion, a small-diameter lower portion formed integrally with the large-diameter upper portion, and an axial bore extending throughout the large-diameter and small-diameter portions. The shafts 18 and 19 of the turntables 16 and 17 are force-fitted into the axial bores of the bushes 20 and 21 respectively, and after inserting the small-diameter portions of the bushes 20 and 21 through the corresponding bush-receiving holes of the base 15 from above the base 15, the lower end portions of the bushes 20 and 21 protruding downward from the base 15 are caulked to mount the bushes 20 and 21 to the base 15.

It is to be noted in this connection that the cassette 10 is accurately maintained in predetermined horizontal position with its front wall 10c directed toward the front side of the recorder and with the hubs 11 and 12 brought into rotating engagement with the respective turntables 16 and 17.

Referring to FIG. 2, a pair of cassette guides 22, 23 and a pair of cassette retainers 24, 25 are provided on the base 15 so as to maintain the cassette 10 in predetermined vertical position of the base 15. The cassette guides 22 and 23 consist of cylindrical lower portions 22a, 23a, and pin portions 22b, 23b extending integrally from the upper end of the cylindrical lower portions 22a, 23a, respectively. The cassette guides 22 and 23 are fitted in the cassette positioning holes 10g and 10h (FIG. 1) of the cassette 10 at their pin portions 22b and 23b and bear against the lower wall 10b of the cassette 10 at the upper end of their cylindrical lower portions 22a and 23a respectively, when the cassette 10 is mounted in the cassette mounting position. The cassette retainers 24 and 25 are disposed on the base 15 to underlie the cassette 10 adjacent to the right-hand and left-hand ends of the lower wall 10b of the cassette 10. The cassette retainer 24 is in the form of a pin which is fixed to the base 15 at the lower end thereof and bears against the lower wall 10b of the cassette 10 at the upper end thereof. The other cassette retainer 25 is in the form of a molded member which is secured by a screw 26 to the base 15 and comprises a pin 25a extending upward integrally therefrom to bear at the upper end thereof against the lower wall 10b of the cassette 10. Further, the pin portions 22b and 23b of the respective cassette guides 22 and 23 cooperate with a pair of leaf springs 27 and 28 to act as additional means for maintaining the cassette 10 in the predetermined horizontal position. In the cassette tape recorder of the present invention, the pin portions 22b and 23b of the cassette guides 22 and 23 are respectively received in the cassette-positioning holes 10g and 10h (FIG. 1) of the cassette 10 in the manner above described, and the leaf springs 27 and 28 are fixed to the base 15 adjacent to the right-hand and left-hand ends of the front wall 10c (FIG. 1) of the cassette 10 so as to normally urge the cassette 10 toward the front side of the recorder. Thus, the cassette 10 can be accurately positioned in the predetermined mounting position.

Figure 4:
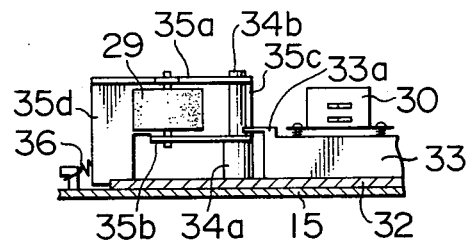
FIG. 4 is a sectional view taken along the line IV — IV in FIG. 1.

A pinch roller 29, a recording-reproducing head 30, and an erase head 31 are respectively disposed from left to right in FIG. 2 opposite to the relatively large openings (not shown) bored in the front wall 10c of the cassette 10. These three parts are mounted on a slide member 32 which is adapted for sliding movement toward and away from the cassette 10 in parallel relation with the base 15, that is, in directions shown by the arrows A and B. More precisely, the recording-reproducing head 30 and erase head 31 are mounted on a molded member 33 which determines the vertical position of these magnetic heads, and are secured to screws together with the member 33 to the slide member 32 at the positions opposite to the respective openings bored in the front wall 10c of the cassette 10. On the other hand, the pinch roller 29 is freely rotatably carried by a pinch roller arm 35 mounted for swinging movement around a pivot 34 fixed to the slide member 32 on the left-hand side of the recording-reproducing head 30 in close proximity thereto. As best shown in FIG. 4, the pinch roller arm 35 is in the form of a molded member consisting of a pair of vertically spaced horizontal arm portions 35a, 35b, a vertical portion 35c connecting the horizontal arm portions 35a, 35b, another vertical portion 35d extending vertically downward from the left-hand end of the connecting portion 35c, and a bent portion 35e (FIG. 1) extending rearward from the right-hand end of the connecting portion 35c. The pivot 34 comprises a large-diameter cylindrical lower portion 34a and a small-diameter cylindrical upper portion 34b extending integrally from the upper end of the portion 34a. The small-diameter cylindrical upper portion 34b of the pivot 34 extends through the right-hand side part of the upper and lower horizontal arm portions 35a and 35b of the pinch roller arm 35, and the upper end of the large-diameter cylindrical lower portion 34a of the pivot 34 bears against the lower surface of the lower horizontal arm portion 35b of the pinch roller arm 35 so as to maintain the pinch roller 29 in predetermined vertical position on the base 15.

It is to be noted in this connection that the member 33, which determines the vertical position of the magnetic heads, is provided with an extension 33a which extends from the left-hand end thereof in FIG. 2 to a position directly above the right-hand end of the lower horizontal arm portion 35b of the pinch roller arm 35, and this extension 33a serves to prevent escapement of the pinch roller arm 35 from the pivot 34. A coil spring 36 is anchored at one end thereof to the bent portion 35e of the pinch roller arm 35 and at the other end thereof to an upward bent portion 15a of the base 15 as shown in FIGS. 1 and 4, so that the lower horizontal arm portion 35b of the pinch roller arm 35 can be always pressed at the lower surface thereof against the upper end of the large-diameter cylindrical lower portion 34a of the pivot 34, and the pinch roller arm 35 can be normally urged to swing counter-clockwise around the pivot 34. This swinging movement of the pinch roller arm 35 is limited by engagement of the vertical downward extending portion 35d of the pinch roller arm 35 with one side 32a of the slide member 32 as shown in FIG. 1.

As described hereinbefore, the slide member 32 is slidable in the directions of the arrows A and B so that the pinch roller 29 and magnetic heads 30, 31 can be urged toward and away from the cassette 10. This slide member 32 extends on the base 15 from the area behind the pinch roller 29 and magnetic heads 30, 31 toward the area adjacent to the rear wall 10d of the cassette 10 across the take-up and supply turntables 16 and 17. The sliding movement of the slide member 32 is guided by three guide means. The shaft 18 of the take-up turntable 16 provides one of the three guide means, the shaft 19 of the supply turntable 17 provides another guide means, and a suitable element such as a screw 37 fixed to the base 15 behind the recording-reproducing head 30 provides the remaining guide means. More precisely, the large-diameter upper portions of the bushes 20 and 21 securely holding the shafts 18 and 19 of the turntables 16 and 17 are respectively formed with circumferential grooves which make sliding engagement with a pair of guide slots 32b and 32c formed in the slide member 32. The screw 37 is engaged by another guide slot 32d formed in the slide member 32. As will be seen in FIG. 3, the screw 37 is set at such a position that the recording-reproducing head 30 is situated at substantially the center of gravity of a triangle consisted of the shafts 18 and 19 and the screw 37 in the play mode.

The slide member 32 is normally urged by a coil spring 38 toward the retracted position determined by the combination of the screw 37 and the guide slot 32d. Thus, in this retracted position, the pinch roller 29 and magnetic heads 30, 31 are retracted away from the cassette 10. A brake member 39 is disposed above the slide member 32 in the area forward relative to the turntables 16 and 17, that is, on the side near the front end of the base 15. This brake member 39 is also slidable in the directions of the arrows A and B like the slide member 32. The right-hand end of the brake member 39 is received in a guide slot bored in another upward bent portion 15b of the base 15 and extending in the sliding direction A - B, while the left-hand end thereof is received in a recess formed in the cassette retainer 25. This brake member 39 is formed with a pair of spaced upward bent portions 39a and 39b opposite to the respective turntables 16 and 17 and is normally urged by a spring (not shown) toward the rear side of the base 15. Thus, the upward bent portions 39a and 39b of the brake member 39 are normally brought into braking engagement with the respective turntables 16 and 17.

An actuating push button group 40 is disposed opposite to the rear wall 10d of the cassette 10. This actuating push button group 40 includes a PAUSE button 40a, and FF button 40b, a PLAY button 40c, a REW button 40d, a REC button 40e, and a STOP/EJECT button 40f of same shape which are arranged from left to right as shown. The individual buttons 40a, 40b, 40c, 40d, 40e, and 40f are respectively mounted on externally protruding end portions of button levers 41a, 41b, 41c, 41d, 41e and 41f of same shape. It is to be noted in this connection that these button levers 41a, 41b, 41c, 41d, 41e and 41f are swingably mounted on a common pivot 42 which is disposed beneath the base 15 as will be seen in FIGS. 5 and 6. More precisely, an auxiliary mounting member 43 is fixed to the lower surface of the base 15, and the pivot 42 is journaled in opposite side walls 43a and 43b of the mounting member 43 and carries the button levers 41a, 41b, 41c, 41d, 41e and 41f for free swinging movement thereon.

Figure 5:
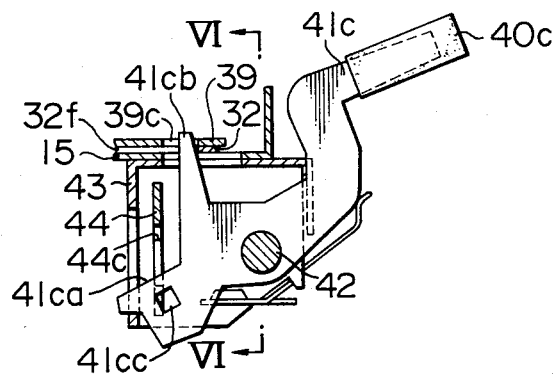
FIG. 5 is a sectional view taken along the line V — V in FIG. 2.
Figure 6:
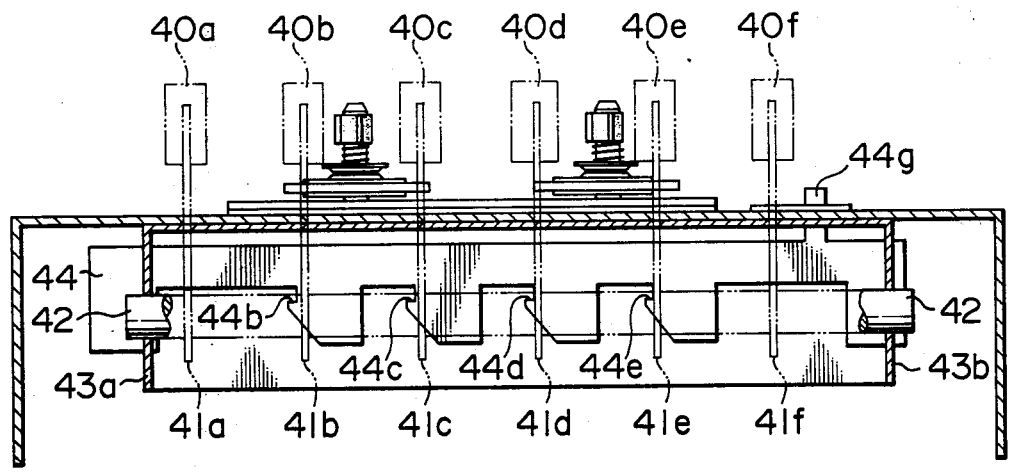
FIG. 6 is a schematic sectional view taken along the line VI — VI in FIG. 5.

A locking plate 44 extends across the opposite side walls 43a and 43b of the mounting member 43 for sliding movement toward the left and right in FIG. 6. This locking plate 44 is normally urged toward the left in FIG. 6 by a spring (not shown). This locking plate 44 is formed with a plurality of locking lugs 44b, 44c, 44d and 44e opposite to the respective button levers 41b, 41c, 41d and 41e. These locking lugs 44b, 44c, 44d and 44e are respectively associated with the corresponding locked portions or lug-engaging portions of the button levers 41b, 41c, 41d and 41e. One of these lug-engaging portions is shown in the form of a hole 41cc of the button lever 41c in FIG. 5.

Figure 3:
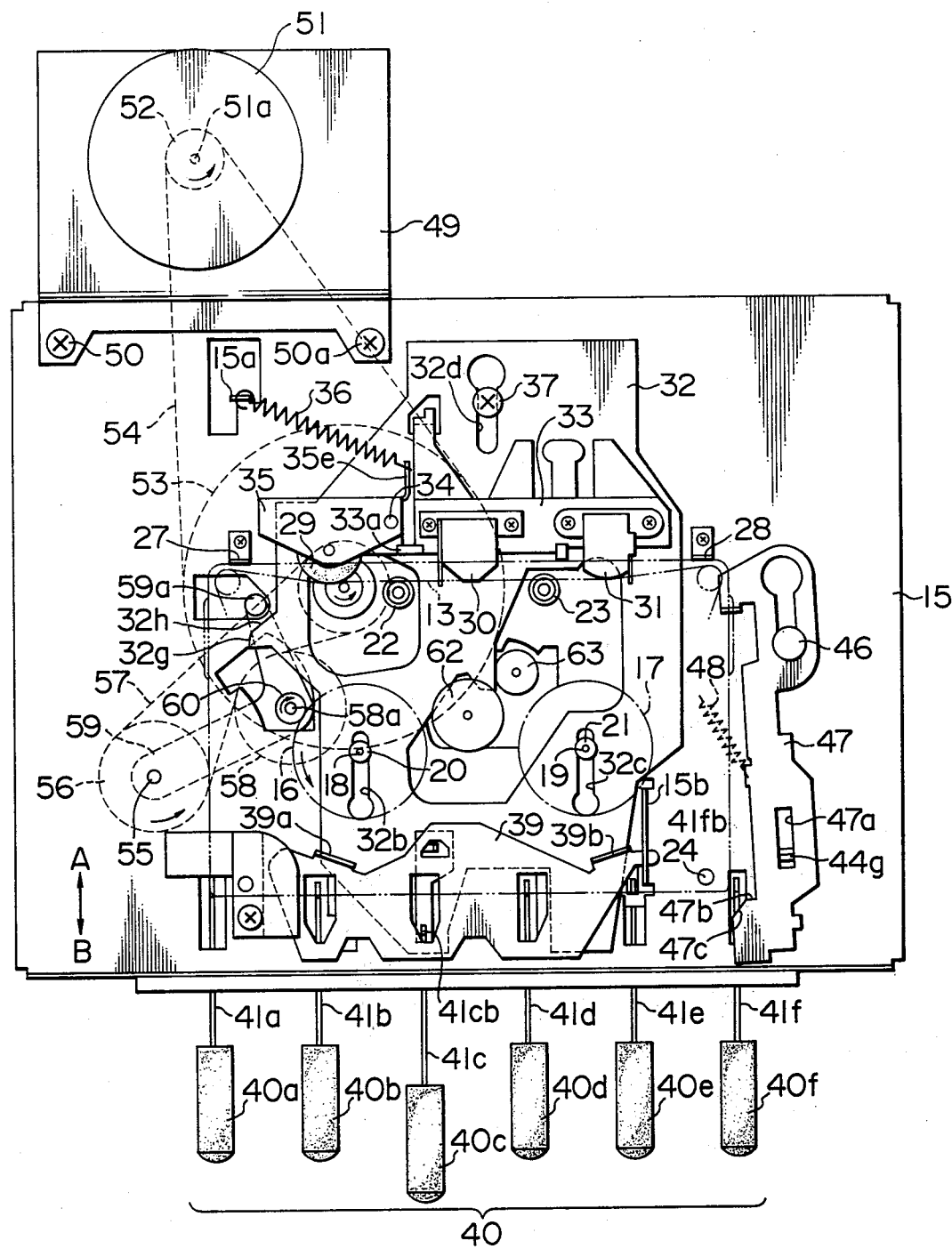
FIG. 3 is a view similar to FIG. 2, but showing the recorder in the play mode.

When, for example, the PLAY button 40c is depressed in FIG. 5 to cause clockwise swinging movement of the associated button lever 41c around the pivot 42, a lock-engaging portion 41ca of the swinging button lever 41c imparts the force tending to cause sliding movement of the locking plate 44 toward the right in FIG. 6 until the locking lug 44c of the locking plate 44 engages the lug-engaging portion 41cc of the button lever 41c to lock the button lever 41c in the locked position. The button lever 41c includes an extension 41cb which extends upward through a slot of the base 15, a slot 32f of the slide member 32, and a slot 39c of the brake member 39. Therefore, when the button lever 41c is locked in position due to the depression of the PLAY button 40c, the extension 41cb of the button lever 41c causes sliding movement of both the slide member 32 and the brake member 39 toward the right in FIG. 5, that is, toward the front side of the recorder or in the direction of the arrow B in FIG. 1. As a result, the pinch roller 29, recording-reproducing head 30 and erase head 31 are advanced toward and into the cassette 10 as shown in FIG. 3. The pinch roller 29 is pressed through the magnetic tape 13 against a capstan 45 received in the capstan-receiving hole 10i (FIG. 1) of the cassette 10, and the recording-reproducing head 30 and erase head 31 are pressed against the tape 13. Further, due to the sliding movement of the brake member 39, the upward bent portions 39a and 39b of the brake member 39 are disengaged from the braking engagement with the respective turntables 16 and 17.

As shown in FIG. 6, the locking plate 44 includes a tongue 44g extending upward from the right-hand side thereof to protrude from the base 15 through associated slots bored in the auxiliary mounting member 43 and base 15. Referring to FIGS. 1 and 2, a slider 47 is disposed on the base 15 so as to be swingable around a pivot 46 fixed to the base 15. The upward extending tongue 44g of the locking plate 44 extends further upward through a slot 47a formed in the slider 47. This slider 47 is normally urged by a spring 48 to swing clockwise around the pivot 46, and this clockwise swinging movement of the slider 47 is limited by engagement of an engaging portion 47b thereof with the upward extension 41fb of the button lever 41f associated with the STOP/EJECT button 40f. In response to the depression of the PLAY button 40c causing the sliding movement of the locking plate 44 toward the right in FIG. 6 in the manner described, the upward extending tongue 44g of the locking plate 44 moves also in the same direction thereby causing counter-clockwise swinging movement of the slider 47 around the pivot 46 as shown in FIG. 3. As a result, a sloped portion 47c contiguous to the engaging portion 47b of the slider 47 is now brought to a position opposite to the upward extension 41fb of the button lever 41f associated with the STOP/EJECT button 40f. Therefore, in response to the depression of the STOP/EJECT button 40f after the tape play initiated by the depression of the PLAY button 40c, the upward extension 41fb of the button lever 41f is urged forward or in the direction of the arrow B in FIG. 3 to cause further swinging movement of the slider 47 in FIG. 3, hence further sliding movement of the locking plate 44 toward the right in FIG. 6. Consequently, the button lever 41c is released from the state locked by the locking plate 44, and the PLAY button 40c is restored to the original position upon release of the depressing pressure from the STOP/EJECT button 40f. Of course, the locking plate 44 is also restored to the original non-locking position.

Referring to FIG. 2, an auxiliary base 49 is secured by screw 50 and 50a to a left-hand portion of the upper side of the base 15. A d-c motor 51 is mounted on this auxiliary base 49 with its shaft 51a extending downward through an opening bored in the auxiliary base 49, and a motor pulley 52 is mounted on this motor shaft 51a. The capstan 45 is force-fitted in the central bore of a flywheel 53, and a belt 54 is trained around the motor pulley 52 and flywheel 53. The flywheel 53 includes a reduced-diameter cylindrical portion 53a as an integral part thereof. A shaft 55 extends downward from the base 15 at a position on the left-hand side of the take-up turntable 16, and a pulley 56 is mounted freely rotatably on this shaft 55. Another belt 57 is trained around this pulley 56 and the reduced-diameter cylindrical portion 53a of the flywheel 53, and this belt 57 is engaged by a take-up pulley 58 having a slip means between it and its shaft 58a. This shaft 58a is mounted freely rotatably to a middle portion of a take-up arm 59 in the form of a bell crank pivoted at one end thereof on the shaft 55 carrying the pulley 56. The shaft 58a extends upward through an opening 15c of the base 15 and carries at the upper end thereof a pulley 60 which is disposed opposite to the take-up turntable 16. A lug 59a is formed integrally at the other end of the take-up arm 59 and extends upward through another opening 15d of the base 15. The take-up arm 59 is normally urged to swing clockwise around the shaft 55 by the force of a spring 61, and thus, the upward extending lug 59a of the take-up arm 59 is normally brought into engagement with an engaging portion 42g projecting from the slide member 32. Thus, when the slide member 32 makes sliding movement in the play mode toward the front side of the base 15, that is, in the direction of the arrow B in FIG. 2, the lug 59a of the take-up arm 59 normally biased clockwise by the spring 61 is advanced toward the right in FIG. 2 by being guided by a sloped portion 32h contiguous to the engaging portion 32g of the slide member 32, thereby bringing the pulley 60 into rotating engagement with the take-up turntable 16 as shown in FIG. 3.

Referring to FIG. 2 again, a pair of idler pulleys 62 and 63 are disposed between the turntables 16 and 17. Another idler pulley (not shown) is disposed beneath the idler pulley 62 in coaxial relation with the latter and is brought into rotating engagement with the flywheel 53 in the FF or REW mode. Thus, when the FF button 40b is depressed for fast forwarding, the slide member 32 makes no sliding movement, while the brake member 39 makes sliding movement in the direction of the arrow B, and the idler pulley 62 is brought into rotating engagement with the take-up turntable 16. On the other hand, when the REW button 40d is depressed for rewinding, the slide member 32 makes no sliding movement, while the brake member 39 makes sliding movement in the direction of the arrow B, and the idler pulley 62 urges the idler pulley 63 to bring the latter into rotating engagement with the supply turntable 17.

The operation of the cassette tape recorder according to the present invention in the play mode will now be described with reference to the drawing. In response to the depression of the PLAY button 40c in the stop mode shown in FIGS. 1 and 2, the slide member 32 and brake member 39 make sliding movement in the direction of the arrow B, and the PLAY button 40c is locked in the depressed position by the locking plate 44 shown in FIGS. 5 and 6. In the play mode, the brake member 39 is disengaged from the turntables 16 and 17, and the tape 13 is engaged by the pinch roller 29, recording-reproducing head 30 and erase head 31 as seen in FIG. 3. The capstan 45 is engaged by the pinch roller 29 through the tape 13, and the pulley 60 is brought into rotating engagement with the take-up turntable 16. Further, in this play mode, a power supply switch (not shown) is turned on, and the counter-clockwise rotation of the motor shaft 51a, flywheel 53, capstan 45 and take-up turntable 16 takes place to take up the tape 13 at the predetermined take-up speed. The tape end may be detected automatically for releasing the locking plate 44 from the locking position. The locking plate 44 can also be released from the locking position upon depression of the STOP/EJECT button 40f at the end of the play in the manner described hereinbefore.

It will be understood from the foregoing detailed description that the present invention provides a novel cassette tape recorder which facilitates visual confirmation of the internal state of a cassette mounted therein. This advantage is obtained by such a unique construction that the pinch roller and magnetic heads are disposed on the other side of the cassette remote from the disposed side of the actuating push button group, and the pivot point of the actuating push button group is disposed beneath the recorder base, so that the distance between the push button group and the cassette mounting position can be considerably reduced compared with conventional recorders of this kind, and yet, the push buttons including the play button can be manipulated as easy as in the conventional ones.

The present invention is further advantageous in that the number of recorder parts can be economically reduced by virtue of the unique arrangement in which the slide member carrying the pinch roller and magnetic heads is adapted for sliding movement in the play mode by being guided by the shafts of the take-up and supply turntables.

In the present invention, the sliding movement of the slide member taking place in response to the depression of the play button is guided by the three guide means including, in addition to the turntable shafts, the screw or any other suitable element disposed on the other side of the magnetic heads, especially, the recording-reproducing head remote from the disposed side of the turntable shafts, so that the recording-reproducing head can be situated at substantially the center of gravity of a triangle consisted of the shafts and the screw in the play mode. This arrangement is advantageous in that the tape can be engaged by the recording-reproducing head at the practically most stable position in the play mode to ensure stable and reliable recording and reproduction.

Furthermore, the unique arrangement of the present invention comprises disposition of the brake member in superposed relation above the slide member. This arrangement is advantageous in that the brake mounting work is facilitated and the cost of the recorder can be reduced due to the fact that any especial connecting means for the actuation of the brake member are utterly unnecessary. In the present invention, the brake member is adapted for sliding movement by being guided by the upward bent portion of the recorder base and by the recess of the vertical positioning member for the cassette. Thus, any especial guide means for the brake member are utterly unnecessary, and the above advantage can be obtained.

Moreover, according to the unique arrangement of the present invention, the vertical positioning member for the magnetic heads acts also to prevent objectionable escapement of the pinch roller arm from the pivot pivoting the arm to the slide member. This arrangement is advantageous in that any especial element, for example, an E-ring generally employed for preventing escapement of the pinch roller arm carrying the pinch roller is utterly unnecessary, thereby facilitating the arm mounting work and reducing the cost of the recorder.

I claim:

1. A cassette tape recorder of the kind using a cassette including a housing which has an upper wall, a lower wall, a front wall, a rear wall, and a pair of side walls, and in which a magnetic tape wound around one of a pair of hubs supported freely rotatably between the upper and lower walls with one end thereof fixed to that hub is guided toward the other hub along a path extending adjacent to a plurality of openings bored in the front wall to be wound around the other hub with the other end thereof fixed to the latter hub, the tape being adapted to be fed at a predetermined take-up speed during recording and reproduction, comprising:

a base;
  a supply turntable and a take-up turntable mounted freely rotatably to said base and having a center-to-center distance equal to that of said hubs in said cassette;
  means mounted to said base for positioning and maintaining said cassette in a predetermined cassette mounting position such that said cassette is positioned with its front wall directed toward the rear side of said base and said hubs are brought into rotating engagement with said supply and take-up turntables respectively;
  a slide member arranged for sliding movement and carrying at least a recording-reproducing head and a pinch roller at positions opposite to the openings in the front wall of said cassette maintained in the predetermined cassette mounting position;
  guide means mounted on said base member with respect to guide slots formed in said slide member for guiding said slide member in its movement toward and away from the front side of said base;
  spring means for biasing said slide member away from the front side of said base to hold said recording-reproducing head and said pinch roller spaced from said cassette;
  a pivot disposed beneath said base on the rear wall side of said cassette;
  a play button lever pivoted to said pivot for swinging movement around said pivot, said play button lever including an outwardly protruding portion mounted to a play button and an upwardly extending portion extending upwardly through a slot in said base and a slot formed in said slide member, whereby said upwardly extending portion contacts said slide member and presses said slide member toward the front side of said base to bring the at least one recording-reproducing head and pinch roller into an operative position in response to depression swinging movement of said play button against the biasing force of said spring means; and
  means for feeding said tape at the predetermined take-up speed toward said take-up turntable by operating in interlocking relation with the swinging movement of said play button.

2. A cassette tape recorder as claimed in claim 1, wherein said guide means include two bushes fitting respectively shafts of said supply and take-up turntables and mounted to said base.

3. A cassette tape recorder as claimed in claim 1, wherein said guide means comprises two bushes and a guide member mounted to said base, said two bushes fitting respectively shafts of said supply and take-up turntable, said guide member being disposed at such a position that said recording-reproducing head is situated at substantially the center of gravity of a triangle by the two shafts and said guide member in the play mode taking place by the depression of said play button.

4. A cassette tape recorder as claimed in claim 1, wherein said pinch roller is supported freely rotatably by a pinch roller arm which is mounted for swinging movement around a pivot fixed to the slide member on the side of said recording-reproducing head, said recording-reproducing head being mounted on a molded member fixed to said slide member, said molded member including an extension extending to a position directly above said pinch roller arm to prevent escapement of said pinch roller arm from said pivot.

5. A cassette tape recorder as claimed in claim 1, wherein said play button lever in response to depression swinging movement of said play button causes movement of said slide member and advancement of said recording-reproducing head and said pinch roller into said cassette through said openings until said head and pinch roller are brought into engagement with the tape of said cassette.

6. A cassette tape recorder of the kind using a cassette including a housing which has an upper wall, a lower wall, a front wall, a rear wall, and a pair of side walls, and in which a magnetic tape wound around one of a pair of hubs supported freely rotatably between the upper and lower walls with one end thereof fixed to that hub is guided toward the other hub along a path extending adjacent to a plurality of openings bored in the front wall to be wound around the other hub with the other end thereof fixed to the latter hub, the tape being adapted to be fed at a predetermined take-up speed during recording and reproduction, comprising:

a base;
  a supply turntable and a take-up turntable mounted freely rotatably to said base and having a center-to-center distance equal to that of said hubs in said cassette;
  means mounted to said base for positioning and maintaining said cassette in a predetermined cassette mounting position such that said cassette is positioned with its front wall directed toward the rear side of said base and said hubs are brought into rotating engagement with said supply and take-up turntables respectively;
  a slide member carrying at least a recording-reproducing head and a pinch roller at positions opposite to the openings in the front wall of said cassette maintained in the predetermined cassette mounting position, said slide member extending on said base from the area adjacent to the front wall of said cassette beyond the area including said supply and take-up turntables;
  first guide means including guide members mounted on said base member with respect to guide slots formed in said slide member and for guiding said slide member toward and away from the front side of said base;
  first spring means for biasing said slide member away from the front side of said base to hold said recording-reproducing head and said pinch roller spaced from said cassette;
  a brake member disposed above said slide member and extending substantially between said turntables and the rear wall of said cassette;

second guide means for guiding said brake member toward and away from said supply and take-up turntables;

second spring means for biasing said brake member toward said turntables to make braking engagement therewith;

a pivot disposed beneath said base on the rear wall side of said cassette;

a play button lever pivoted to said pivot for swinging movement around said point, said play button lever including an outwardly protruding portion mounted to a play button and a portion extending upwardly through a slot in said base and a slot formed in said slide member and a slot formed in said brake member, whereby said upwardly extending portion contacts said slide member and said brake member and presses said slide member and said brake member toward the front side of said base to bring the at least one recording-reproducing head and pinch roller into an operative position in response to depression swinging movement of said play button against the biasing forces of said first and second spring means; and means for feeding said tape at the predetermined take-up speed toward said take-up turntable by operating in interlocking relation with the swinging movement of said play button.

7. A cassette tape recorder as claimed in claim 6, wherein said second guide means comprises a slot bored in an upwardly bent portion of said base and a recess formed in a retainer which is disposed on said base to underlie said cassette adjacent to one end of the lower wall of said cassette, said brake member being guided at one end thereof by said slot and at the other end thereof by said recess, said retainer having a pin extending upwardly integrally therefrom to bear against said cassette.

8. A cassette tape recorder as claimed in claim 6, wherein said play button lever in response to depression swinging movement of said play button causes movement of said slide member and advancement of said recording-reproducing head and said pinch roller into said cassette through said openings until said head and pinch roller are brought into engagement with the tape of said cassette.

* * * * *